No. 686,751. Patented Nov. 19, 1901.
H. McLOUGHLIN.
VEHICLE WHEEL.
(Application filed Mar. 26, 1901.)
(No Model.) 3 Sheets—Sheet 1.
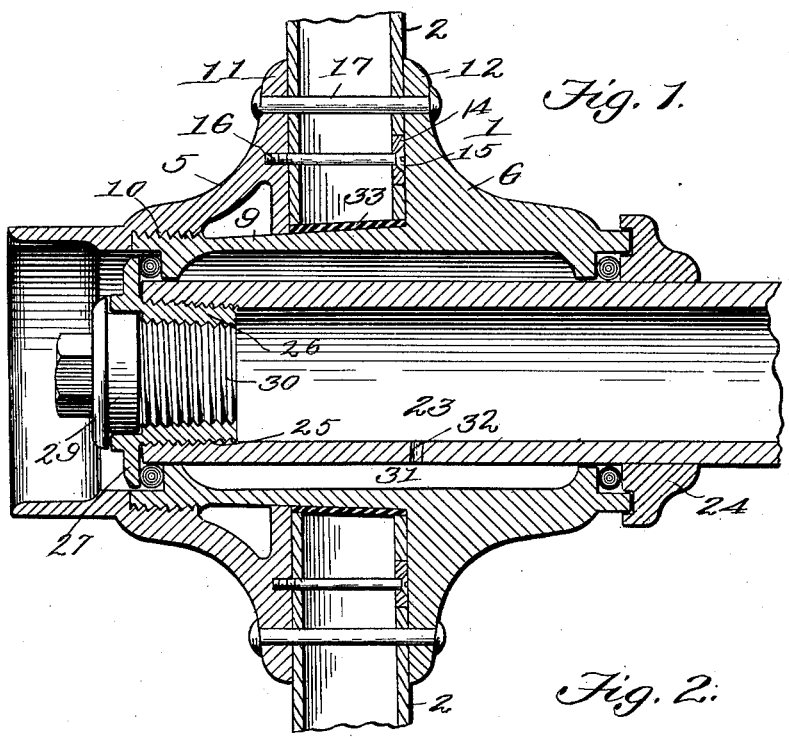
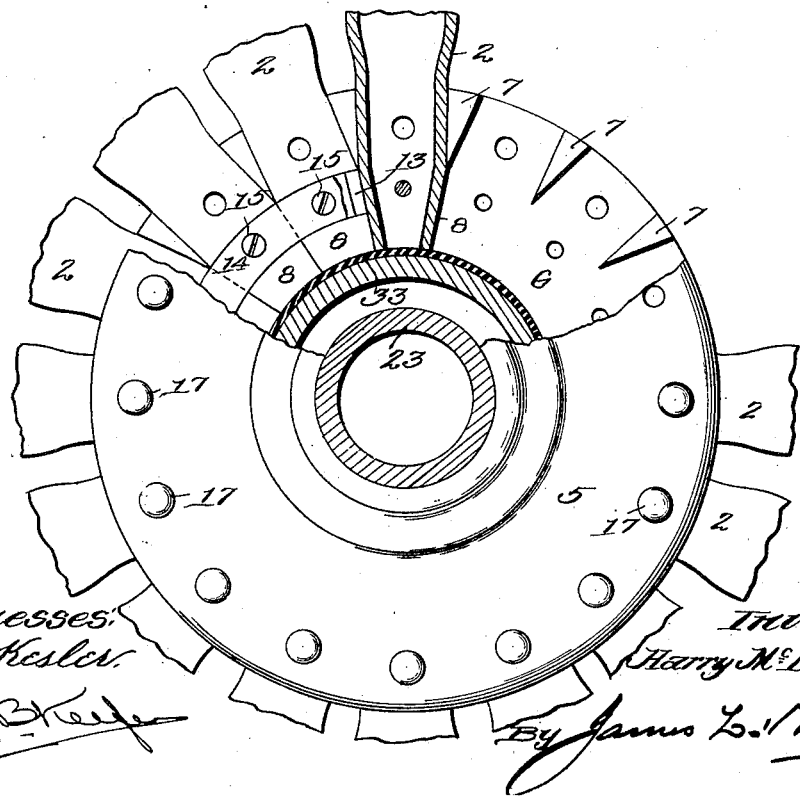
Witnesses: Inventor
Harry McLoughlin
By James L. Norris
Atty.

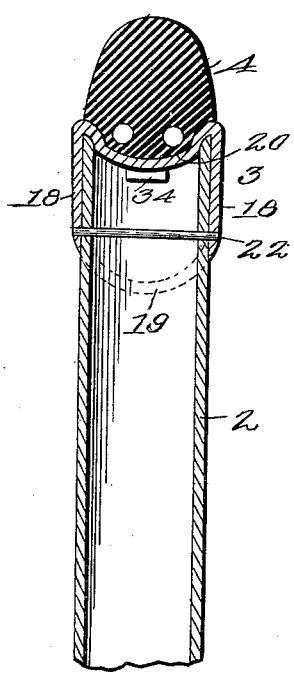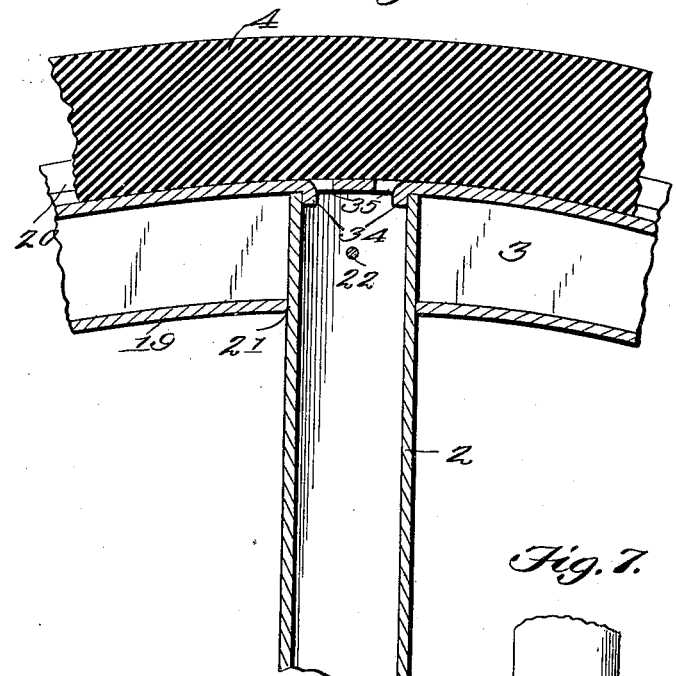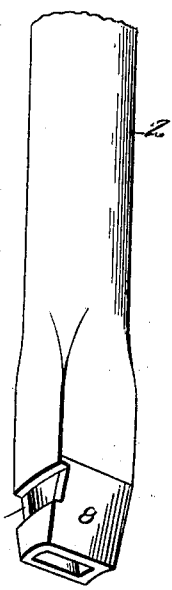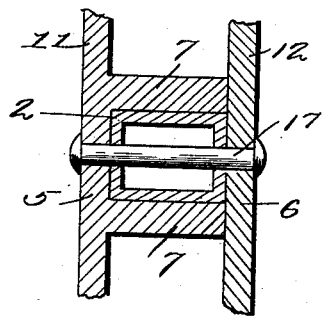

No. 686,751. Patented Nov. 19, 1901.
H. McLOUGHLIN.
VEHICLE WHEEL.
(Application filed Mar. 26, 1901.)

(No Model.) 3 Sheets—Sheet 3.

Witnesses:

Inventor
Harry McLoughlin
By James L. Norris.
Atty.

THE NORRIS PETERS CO., PHOTO-LITHO., WASHINGTON, D. C.

UNITED STATES PATENT OFFICE.

HARRY McLOUGHLIN, OF STAPLETON, NEW YORK, ASSIGNOR TO BARTON E. KINGMAN, OF YONKERS, NEW YORK.

VEHICLE-WHEEL.

SPECIFICATION forming part of Letters Patent No. 686,751, dated November 19, 1901.

Application filed March 26, 1901. Serial No. 52,964. (No model.)

*To all whom it may concern:*

Be it known that I, HARRY McLOUGHLIN, a citizen of the United States, residing at Stapleton, Staten Island, in the county of Richmond and State of New York, have invented new and useful Improvements in Vehicle-Wheels, of which the following is a specification.

My invention relates to vehicle-wheels, the object of the same being to provide an elastic metallic wheel of greater strength and less weight than the ordinary wooden wheels.

A further object of the invention is to provide a metal wheel all the parts of which are firmly united together, in which the strain thereof is equally distributed throughout all parts, and in which danger of crystallization is reduced to a minimum.

Other objects and advantages of the invention will hereinafter appear, and the novel features thereof will be set forth in the claims.

Figure 8:
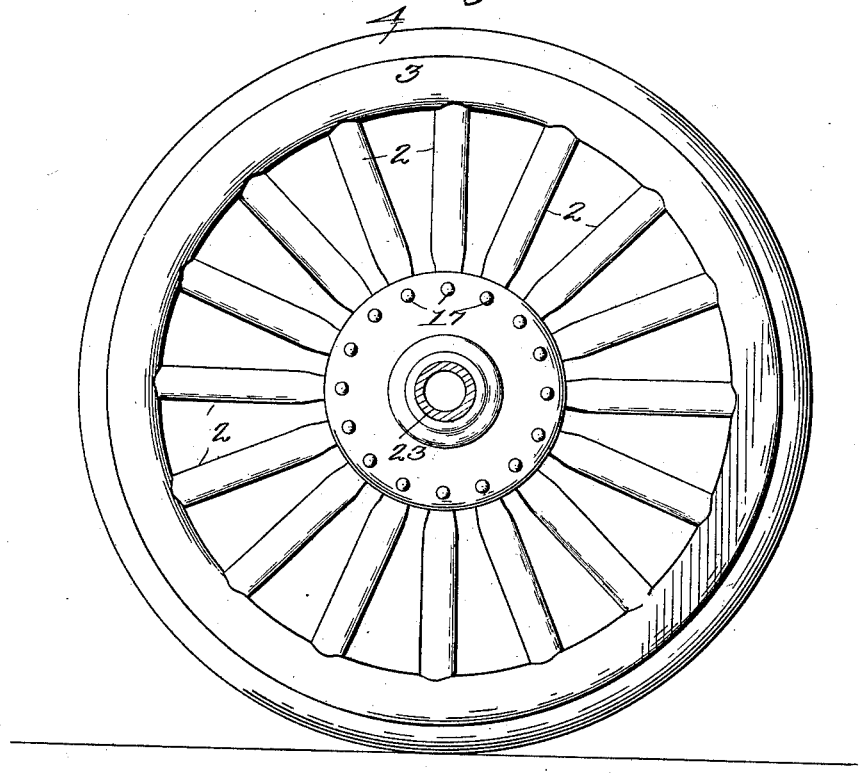
Figure 9:
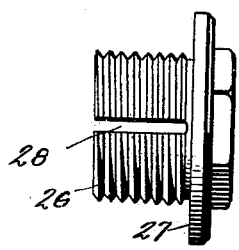
Figure 10:
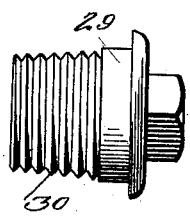

In the drawings forming a part of this specification, Figure 1 is a longitudinal sectional view taken through the hub of the wheel and the axle on which the same is mounted. Fig. 2 is a sectional elevation of the same. Fig. 3 is a cross-section of the rim and tire. Fig. 4 is a section at right angles to Fig. 3. Fig. 5 is a detail cross-sectional view of a portion of the hub. Fig. 6 is a perspective view of the outer end of one of the spokes. Fig. 7 is a similar view of the inner end thereof. Fig. 8 is an elevation of the wheel complete. Fig. 9 is an elevation of the expansible washer, and Fig. 10 is a similar view of the screw-plug for expanding the same.

Like reference-numerals indicate like parts in the different views.

My improved wheel is made up of the hub 1, the spokes 2, the rim 3, and the tire 4. The hub 1 is made in two parts 5 6, the part 5 being provided with inwardly-extending radially-disposed flanges or ribs 7, the opposite side walls of each of which converge from the outer end of the part 5 inwardly. The spaces between the flanges or ribs 7 receive the spokes 2, which are tubular in form, with the lower ends thereof rectangular in cross-section, so as to conform to the sides of the flanges or ribs 7. The extreme inner ends of the spokes 2 are tapering, as shown at 8, and the tapering walls of the adjacent spokes abut against each other. The part 6 of the hub 1 has a tubular web 9 thereon, which extends into the part 5 and has a screw-threaded connection therewith, as shown at 10. The web 9 serves as the bottom wall for each of the spaces between the ribs or flanges 7, which constitute the sockets in which the spokes 2 fit. The radial projections 11 and 12 of the parts 5 and 6 of the hub 1 lie opposite to each other, the projection 12 abutting against the ends of the ribs or flanges 7 and closing the spaces between said flanges. On one side of each of the spokes 2, near the inner end thereof, is formed a segmental groove or recess 13, in which fits a securing-ring 14, through which pass at intervals the screws 15, the inner ends of which enter the radial projection 11 of the part 5, as at 16. By means of the ring 14, which fits within the grooves 13 in each of the spokes 2, and the screws 15, which retain said ring 14 in place, each of said spokes 2 is held rigidly to the part 5 of the hub 1, fitting within the sockets formed by the spaces between the flanges or ribs 7. The parts 5 and 6 of the hub 1 and the spokes 2 are further secured in place by means of the bolts or rivets 17, which extend through the radial projections 11 and 12, as clearly shown.

The rim 3 of the wheel is a seamless endless metallic tube having parallel sides 18, a convex inner wall 19, and a tire-receiving channel or depression 20, as clearly shown. The inner wall 19 of the rim 3 is provided at intervals with openings 21 for the reception of the outer ends of the spokes 2, the side walls of said spokes, when the same are in place within the rim 3, lying in close contact with the inner surfaces of the sides 18 of said rim. The outer ends of the spokes 2 abut against the inner surface of the outer wall of said rim, and said spokes are locked in place to said rim by means of the transversely-extending pins 22. The tire 4 is secured in place upon the rim 3 in any suitable manner.

The hub 1 of my improved wheel is mounted upon a hollow or tubular axle 23, the same having at one end a ball-bearing or other connection with a fixed collar 24 thereon. The extreme outer end of the axle 23 is provided with internal screw-threads 25, with which engages the tubular extension 26 of a washer 27. The said washer 27 serves as a means for attaching the hub 1 to the axle 23, the outer edge thereof overlapping and inclosing the end of the web 9 of the part 6 of said hub. Suitable antifriction-bearings are provided between the washer 27 and the hub 1. The extension 26 of said washer is provided with longitudinal slits 28, which provide for the expansion of the same into locking engagement with the axle 23, and the bore of said extension is tapering and internally screw-threaded for the reception of an expanding plug 29. The said plug 29 is provided with a rectangular extension for the application of a key or wrench, and the walls of the threaded portion 30 thereof, which fit in the bore of the extension 26 of the washer 27, are tapering, as clearly shown. It will thus be seen that when the plug 29 is screwed into the washer 27 the extension 26 of the latter will be spread or forced outwardly into locking engagement with the screw-threads 25 of the axle 23. The hub is thereby locked to the axle 23 with provision for rotary movement thereon and prevented from accidental detachment.

It will be noted that the inner surface of the web 9 of the part 6 of the hub 1 is formed with an internal annular recess or pocket 31, with which communicate the passages 32, leading from the interior of the axle 23 and through which oil or other lubricating material may pass from the cavity in said axle to said recess and thence to the bearings. The opening in the axle 23 is of course closed at a point adjacent to the outer end thereof, preferably opposite the collar 24.

In assembling the parts of my invention the outer ends of the spokes 2 are first introduced into the openings 21 in the rim 3 and the pins 22 applied. The inner ends of said spokes are then introduced into the spaces between the ribs or flanges 7 of the part 5 of the hub 1 and locked in position by means of the ring 14, which fits within the grooves 13 in said spokes, and the screws 15, which extend through said ring into said part 5. All of these parts are then brazed or welded together, so as to form a unitary structure or an integral piece, as will be clearly understood. The part 6 of the hub and the part 5 thereof with the spokes 2 and rim 3 firmly secured thereto constitute two different sections. The part 6 is first applied to the axle 23 by slipping the same over the end thereof, and the part 5 is connected with the part 6 by screwing the same onto the end thereof and locking it in place by means of the bolts or rivets 17. The hub as a whole is connected against removal with the axle 23 by means of the washer 27 and the expanding or locking plug 29.

To provide against the danger of crystallizing the metal of which the different parts of my wheel are made, I locate in the bottom of each of the sockets formed by the ribs or flanges 7 on the part 5 a cushion 33, of hard rubber or other like material, which cushion may be in annular form or in the form of a ring, against which the inner ends of the spokes 2 bear. This cushion is not provided for the purpose of adding resiliency to the wheel, but merely to take up the shocks thereon and prevent the same from causing crystallization of the metal.

It will be seen that when the spokes 2 are in place in the rim 3 inward movement of said ring is prevented by the engagement of the inner surface of the outer wall thereof with the ends of said spokes and also by the engagement of the pins 22 with the two parts through which they pass. Lateral or twisting movement of the rim 3 is also prevented by the engagement of the inner surfaces of the sides 18 of the rim 3 with the outer surfaces of the different spokes 2. To further provide against any movement between the rim 3 and the spokes 2, I propose to form inwardly-extending projections 34 on the rim 3, which engage the inner surfaces of the outer ends of the different spokes 2. These projections may be formed by merely producing depressions in the outer wall 20 of the rim 3 or by cutting slots 35 in said outer wall 20 and forcing inwardly the lips or tongues formed by the same, as shown.

From the foregoing description it will be seen that I have produced a wheel which is constructed entirely of metal, the spokes 2 and the rim 3 being of tubular form, which are firmly connected together by means of securing devices and by means of brazing or welding, thus providing a unitary structure which is extremely light, elastic, and durable and of less weight than the ordinary wooden wheel. Furthermore, by the provision of the cushion 33 the shocks which are received by the wheel along the periphery or tread-surface thereof are taken up and prevented from causing crystallization of the metal. All the strain upon the different parts of the wheel is equally distributed throughout, which tends further to prevent crystallization or wear at any particular part. The inner ends of the spokes 2 are braced or supported not only by the hub 1, in which they are located, but by the engagement of the adjacent spokes with each other. In the event, therefore, that any one connection between the spokes and the parts to which they are attached becomes broken or otherwise disabled it will not affect the remaining parts or impair the utility of the wheel.

Having now described my invention, what I claim as new, and desire to secure by Letters Patent, is—

1. A vehicle-wheel comprising a hub, tubular metallic spokes secured thereto, a tubular metallic rim having openings in the inner walls thereof into which said spokes project, pins connecting said spokes with said rim, and inwardly-extending projections on said rim engaging the outer ends of said spokes.

2. A vehicle-wheel comprising a hub, tubular metallic spokes secured thereto, a tubular metallic rim having openings in the inner walls thereof into which said spokes project, pins connecting said spokes with said rim, and inwardly-extending projections on said rim engaging the outer ends of said spokes, the opposite ends of said spokes being brazed or welded respectively to said hub and to said rim.

3. A vehicle-wheel comprising a hub, tubular metallic spokes secured thereto, and a seamless tubular metallic rim having parallel side walls and having openings therein through which said spokes project, the outer surfaces of said spokes lying in contact with the inner surfaces of the side walls of said rim and the extreme outer ends of said spokes lying in contact with the inner surface of the outer wall of said rim.

4. A vehicle-wheel comprising a hub, tubular metallic spokes secured thereto, and a seamless tubular metallic rim having parallel side walls and having openings therein through which said spokes project, the outer surfaces of said spokes lying in contact with the inner surfaces of the side walls of said rim and the extreme outer ends of said spokes lying in contact with the inner surface of the outer wall of said rim, the contacting portions of said spokes and said rim being brazed or welded to each other.

5. A vehicle-wheel comprising a hub, tubular metallic spokes secured thereto, and a seamless tubular metallic rim having parallel side walls, the said rim having openings in the inner wall thereof through which said spokes project and having inwardly-extending projections in the outer wall thereof engaging the inner side of the outer ends of said spokes, the outer surfaces of said spokes lying in contact with the inner surfaces of the side walls of said rim and the extreme outer ends of said spokes engaging the inner surface of the outer wall of said rim.

6. A vehicle-wheel comprising a hub, tubular metallic spokes secured thereto, and a seamless tubular metallic rim having parallel side walls, the said rim having openings in the inner wall thereof through which said spokes project and having inwardly-extending projections in the outer wall thereof engaging the inner side of the outer ends of said spokes, the outer surfaces of said spokes lying in contact with the inner surfaces of the side walls of said rim and the extreme outer ends of said spokes engaging the inner surface of the outer wall of said rim, the contacting portion of said spokes of said rim being brazed or welded to each other.

7. A vehicle-wheel comprising a hub, tubular metallic spokes secured thereto, and a seamless tubular metallic rim having parallel side walls, the said rim having openings in the inner wall thereof through which said spokes project and having inwardly-extending lips or tongues on the outer wall thereof which engage the inner surfaces of the outer ends of said spokes, the outer surface of said spokes lying in contact with the inner surfaces of the side walls of said rim and the extreme outer ends of said spokes lying in contact with the inner surface of the outer wall of said rim.

8. In a vehicle-wheel, a hub made in two parts, one of which is provided with radially-disposed ribs or flanges whose side walls converge toward the center of said hub, and the other part of said hub bearing against the ends of said ribs or flanges, spokes fitting within the spaces between said ribs or flanges and provided with segmental grooves, a ring fitting within said grooves, and means for securing said ring to the part of said hub which is provided with said ribs.

9. In a vehicle-wheel, a metallic hub made in two parts, one of which is provided with integral radially-disposed ribs or flanges whose side walls converge toward the center of said hub and whose inner ends terminate a short distance from the center of said hub, and the other part of said hub bearing against the ends of said ribs or flanges, metallic spokes fitting within the spaces between said ribs or flanges, the inner ends of said spokes having converging walls which abut against each other and provided with segmental grooves, a ring fitting within said grooves, and means for securing said ring to the part of said hub which is provided with said ribs.

10. In a vehicle-wheel, a metallic hub made in two parts, each of which has a radial projection thereon, the projection on one of said parts having radial inwardly-extending ribs or flanges thereon whose side walls converge from the outer ends thereof inwardly and whose inner ends terminate a short distance from the center of said hub, tubular metallic spokes fitting within the spaces between said ribs or flanges, the inner ends of said spokes having converging side walls which abut against each other and said spokes being provided with segmental grooves, a ring fitting within said grooves, and means for securing said ring to the radial projection on said hub which is provided with said ribs, and means for connecting the two parts of said hub together.

11. In a vehicle-wheel, a metallic hub made in two parts, each of which has a radial projection thereon, the projection on one of said parts having radial inwardly-extending ribs or flanges thereon whose side walls converge from the outer ends thereof inwardly and whose inner ends terminate a short distance from the center of said hub, tubular metallic spokes fitting within the spaces between said ribs or flanges, the inner ends of said spokes having converging side walls which abut against each other and said spokes being provided with segmental grooves, a ring fitting within said grooves, and means for securing said ring to the radial projection on said hub which is provided with said ribs, a cushion against which the inner ends of said spokes bear, and means for connecting the two parts of said hub together.

12. In a vehicle-wheel, a metallic hub made in two parts, each of which is provided with a radial projection, the projection on one of said parts having radial inwardly-extending ribs or flanges thereon whose side walls converge from the outer ends thereof inwardly, tubular metallic spokes fitting within the spaces between said ribs or flanges having segmental grooves therein, a ring fitting within said grooves and means for connecting said ring with the part of said hub on which said ribs or flanges are formed, the said spokes, ring and flanges being welded or brazed together, and securing means for holding the two parts of said hub together.

13. In a vehicle-wheel, a metallic hub made in two parts, each of which is provided with a radial projection and one of which is provided with an annular web which fits within the other, and the other of said parts having radial inwardly-extending ribs or flanges whose side walls converge from the outer ends thereof inwardly and whose inner ends terminate a short distance from said web, tubular metallic spokes fitting within the spaces between said ribs or flanges having their inner ends formed with converging side walls which abut against each other, securing means for connecting said spokes with the part of the hub on which said ribs or flanges are formed, said spokes, ribs and securing means being brazed or welded together, a cushion surrounding said web against which the inner ends of said spokes bear, and securing means for connecting the two parts of said hub together.

14. The combination with a hollow axle and a wheel mounted thereon, of means for retaining said wheel in place upon said axle, the same comprising a fixed collar on said axle against which one end of the hub of said wheel bears, a washer against which the other end of said hub bears, the said washer having a bore which tapers from the outer end thereof inwardly and having a longitudinally-slitted tubular extension screwing within the end of said axle, and a screw-threaded tapering expanding plug screwing within said cylindrical extension for forcing the same outwardly into locking engagement with said axle.

In testimony whereof I have hereunto set my hand in presence of two subscribing witnesses.

HARRY McLOUGHLIN.

Witnesses:
WM. M. STOCKBRIDGE,
GEO. W. REA.